(12) United States Patent
Papin

(10) Patent No.: US 11,867,590 B2
(45) Date of Patent: Jan. 9, 2024

(54) SYSTEM SEALING TEST DEVICE FOR INSULATING TWO MEDIUMS IN A SEALED MANNER

(71) Applicant: GETINGE LA CALHENE, Vendome (FR)

(72) Inventor: Didier Papin, Selommes (FR)

(73) Assignee: GETINGE LA CALHENE, Vendome (FR)

( * ) Notice: Subject to any disclaimer, the term of this patent is extended or adjusted under 35 U.S.C. 154(b) by 233 days.

(21) Appl. No.: 17/077,537

(22) Filed: Oct. 22, 2020

(65) Prior Publication Data

US 2021/0123829 A1    Apr. 29, 2021

(30) Foreign Application Priority Data

Oct. 25, 2019    (FR) ...................................... 1911999

(51) Int. Cl.
| | |
|---|---|
| *G01M 3/26* | (2006.01) |
| *G01M 3/02* | (2006.01) |
| *G05D 16/20* | (2006.01) |
| *G01M 3/32* | (2006.01) |

(52) U.S. Cl.
CPC .............. *G01M 3/26* (2013.01); *G01M 3/027* (2013.01); *G01M 3/3281* (2013.01); *G05D 16/2066* (2013.01)

(58) Field of Classification Search
CPC ........ G01M 3/26; G01M 3/32; G01M 3/3209; G01M 3/3218; G01M 3/3281; G01M 3/027
See application file for complete search history.

(56) References Cited

U.S. PATENT DOCUMENTS

| | | | |
|---|---|---|---|
| 3,603,138 A | 9/1971 | Peterson | |
| 6,498,496 B1 * | 12/2002 | Keller | ..................... G01L 7/082 |
| | | | 324/711 |
| 6,591,662 B1 | 7/2003 | Grimard et al. | |
| 2018/0231433 A1 * | 8/2018 | Keil | ..................... G01M 3/3218 |
| 2019/0094102 A1 | 3/2019 | Haske et al. | |

FOREIGN PATENT DOCUMENTS

| | | |
|---|---|---|
| FR | 2643713 A1 | 8/1990 |
| FR | 2695343 A1 | 3/1994 |

OTHER PUBLICATIONS

Search Report issued in French Patent Application No. 1911999 dated Jun. 23, 2020.

* cited by examiner

*Primary Examiner* — Erika J. Villaluna
(74) *Attorney, Agent, or Firm* — Pearne & Gordon LLP

(57) ABSTRACT

Device for testing the sealing of at least one system for insulating two mediums in a sealed manner, the system including a flange and a sealed door mounted in the flange, the test device including a casing including an inflatable seal intended to contact, in the inflated state, with the system and to ensure a sealing enabling the definition of a test volume between the system and the casing, a pneumatic pump and a pneumatic circuit configured to connect, in a first step, the pump to the inflatable seal such that the pump inflates the inflatable seal, and in a second step the pump to the test volume such that the pump generates in the test volume a pressure at a given value, and sensor for measuring the pressure in the test volume.

19 Claims, 7 Drawing Sheets

SYSTEM SEALING TEST DEVICE FOR INSULATING TWO MEDIUMS IN A SEALED MANNER

CROSS-REFERENCE TO RELATED APPLICATIONS

This application claims priority to French Patent Application No. 1911999 filed on Oct. 25, 2019, the entire content of which is incorporated by reference herein.

TECHNICAL FIELD AND PRIOR ART

The present invention relates to a system sealing test device for insulating two mediums in a sealed manner, for example for a double door transfer system, and for gloves enabling a manipulation in a sealed environment.

In a certain number of industrial sectors, for the nuclear, medical and pharmaceutical sectors and food industry, is necessary or desirable to carry out certain tasks in a confined atmosphere, either in order to protect the environment, for example from radioactivity, toxicity, etc., or on the contrary, to be able to carry out these tasks in an aseptic or dust-free atmosphere, or finally both simultaneously.

The transfer of apparatus or product of one closed volume to the other, without at any time the sealing of each of these volumes vis-à-vis the outside being broken, poses a difficult problem to overcome. This problem can be resolved by a double door transfer device.

Such a double door device provided with a multiple security command is, for example, known from document FR 2 695 343. Each volume is closed by a door mounted in a flange. Each door is integral with the flange thereof by a bayonet connection and the two flanges are intended to be integral with one another by a bayonet connection.

For example, one of the closed volumes is formed by an insulator and the other volume is formed by a container.

Conventionally, the connecting part carried by the insulator is designed as an alpha part, and the connecting part carried by the container is designed as a beta part.

Before the connection of the two closed volumes, it is desired to verify that each alpha and beta door respects the sealing criteria in order to avoid any risk of interior or exterior contamination during the connection of the two closed volumes.

A technique used to verify the sealing of the alpha and beta parts implements a device including a cavity of which the opening is bordered by a thin and relatively rigid O-ring, the seal being intended to be applied against a thin surface of the flange of the alpha part or of the beta part in order to define with it, a test volume, of which the sealing is tested. For example, a given pressure level is generated, for example the pressure is lowered, in the volume, and it is verified if this is stable over time.

The device is fixed on the alpha part or the beta part so as to press the seal against the surface of the alpha part or the beta part.

In another example, the insulator forms a glovecasing and the glove enables an operator to work inside the glovecasing while remaining insulated from the inside of the glovecasing. It is also desired to verify the sealing of the glove before it is used.

Moreover, it is desired that the test devices are not bulky and light.

DISCLOSURE OF THE INVENTION

It is consequently an aim of the present invention to offer non-bulky and reduced-mass sealing test devices, enabling the verification of the sealing of systems for insulating two mediums in a sealed manner, to verify the sealing, for example of at least one part of a double door transfer system, or of a glove mounted on a glovecasing.

The aim stated above is achieved by a sealing test device including a casing comprising an inflatable seal intended to engage with the system to be tested to delimit a test volume, and one single pump which ensures both the inflation of the seal, and the sealing test.

In the case of the test of a glove, the pump can ensure the inflation of the glove which forms the test volume. In the case of the test of a double door transfer system, the pump can ensure the vacuuming of the test volume.

To test the sealing of a glove or any system including a flexible part, preferably a pump is selected which is capable of inflating a significant volume with a low pressure to inflate the glove or the flexible part, and to inflate a reduced volume with a high pressure to inflate the inflatable seal, enabling the carrying out of the sealing test of a glove or of a system provided with a flexible part in an acceptable time.

To test the sealing of a double door transfer system, preferably a pump is selected which is capable of inflating a reduced volume with a high pressure and of generating a depression between the casing of the device and the alpha part or the beta part.

Very advantageously, the pump is a membrane or diaphragm pump which enables an inflation of a significant volume with a low pressure, the inflation of a reduced volume with a high pressure, and the generation of a depression.

In other words, the sealing test device implements one single pump capable of inflating the seal and of establishing a pressure in a volume of which the sealing is to be verified and a pneumatic circuit which can be commanded to establish the pneumatic connections required for the different steps of the sealing test.

One subject-matter of the present application thus is a device for testing the sealing of at least one system for insulating two mediums in a sealed manner, said test device including a casing comprising an inflatable seal intended to contact, in the inflated state, with the system and to ensure a sealing enabling the definition of a test volume between the system and the casing, a pneumatic pump and a configured pneumatic circuit, in a first step, to connect the pump to the inflatable seal such that the pump inflates the inflatable seal, and in a second step, to connect the pump to the test volume such that the pump generates in the test volume a pressure at a given value, and means for measuring the pressure in the test volume.

In an embodiment example, the pneumatic circuit includes at least one distributor between the pump and the inflatable seal, at least one distributor between the pump and the test volume, and at least one distributor between the inflatable seal, the test volume and a draining zone.

The distributor between the pump and the test volume is advantageously configured to ensure a connection of the test volume, either at a pressure orifice of the pump, or at a depression orifice of the pump.

The pneumatic circuit preferably includes pressure monitoring means in the inflatable seal.

The pump is advantageously a diaphragm pump.

The sealing test device preferably includes a control unit configured to command the pump and the pneumatic circuit.

For example, with the system to be verified being a double door transfer system of an insulator, the pump can thus be configured to reduce the pressure in the test volume with respect to the outer pressure.

In another example, the system to be verified is a double door transfer system of a container, the pump can thus be configured to reduce the pressure in the test volume with respect to the outer pressure.

According to an additional feature, the sealing test device includes fixing means configured to engage with the system to be tested, for example bayonet type fixing means.

When the system to be verified is a system comprising a flexible part, the system being for example a glove, the circuit is advantageously configured to inflate the flexible part.

In the case where the system to be verified is either a system comprising a flexible part, or a double door transfer system of an insulator or of a container, wherein, in the case of the test of a system comprising a flexible part, the control unit is configured to connect in a test phase, the system comprising a flexible part at the pressure orifice of the pump and to connect, at the end of the test, the system comprising a flexible part at the depression orifice of the pump and, in the case of the test of a double door transfer system, the control unit is configured to connect in a test phase, the test volume at the depression orifice of the pump.

According to an additional feature, the control unit includes means for emitting a signal representative of the result of the sealing test.

The distributors are, for example, solenoid valves.

Another subject-matter of the present application is a method for testing the sealing of a system for insulating two mediums in a sealed manner implementing a sealing test device according to the invention, and comprising the following phases:
- Mounting of the device on the system.
- Pneumatic connection of the pump to the inflatable seal.
- Activation of the pump until the pressure in the inflatable seal reaches a first given value.
- Stopping of the pump.
- Pneumatic connection of the pump to the test volume.
- Activation of the pump to establish a pressure at a second given value in the test volume.
- Stopping of the pump.
- Monitoring of the pressure in the test volume.
- Emission of a signal representative of the result of the test.
- Draining of the inflatable seal and of the test volume, if necessary.

The first given value is for example, of the order of 2 bar.

In the case where the system is a double door transfer system of an insulator or of a container, the first given value is preferably a pressure lower than the outer pressure.

In the case of a system comprising a flexible part, the second value is preferably a positive pressure of the order of a few mbar to a few tens of mbar.

Advantageously, for the draining step, the system comprising a flexible part is connected to the depression orifice of the pump.

BRIEF DESCRIPTION OF THE DRAWINGS

The present invention will be better understood based on the following description and the appended drawings, wherein.

DETAILED SUMMARY OF PARTICULAR EMBODIMENTS

The sealing test device according to the invention is intended to test the sealing of a system for insulating two mediums in a sealed manner. The system can be, for example, without this being limiting:
- the alpha part of a double door transfer system carried by a wall of an insulator and which insulates the inside of the insulator from the outer environment.
- the beta part of a double door transfer device carried by a container or a flexible bag and which insulates the inside of the container or of the flexible bag from the outer environment.
- a glove mounted in a glovecasing port and insulating the inside of the glovecasing from the outer environment and enabling an operator to work in the glovecasing while being insulated from the inside of it.

Figure 1:
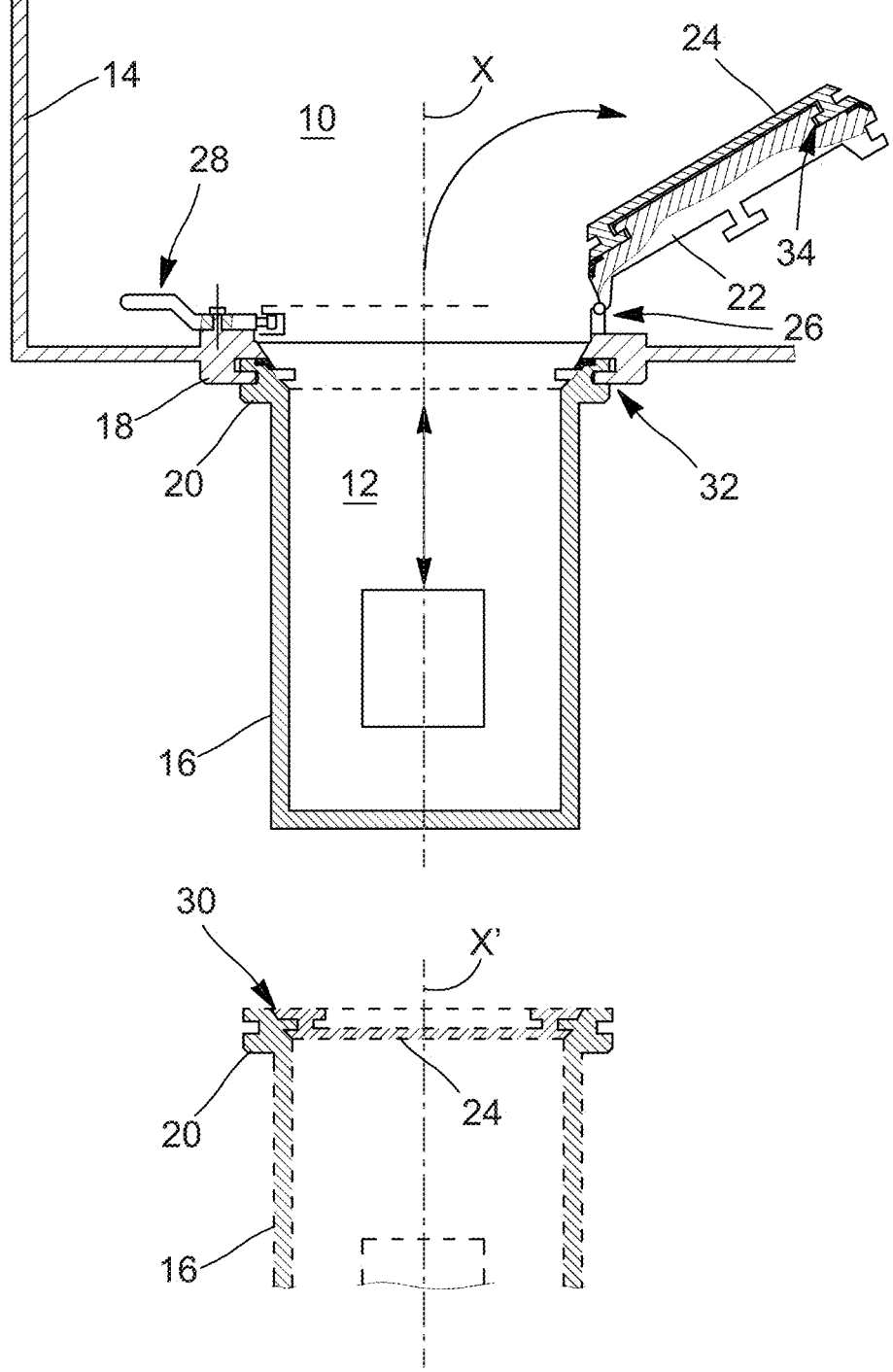
FIG. 1 is a cross-sectional, longitudinal view schematically illustrating the connection of a container on a cell by means of a double door sealed transfer device by bayonet type means.

In FIG. 1, a schematic representation of an example of a double door transfer system can be seen.

In the following description, the two closed volumes of which the sealing is desired to be tested before the connection thereof correspond respectively to an insulator 10 and to a container 12. However, it will be understood that the invention is as applicable in the case where the closed volumes would be in a non-limiting manner, for example, for one, a glovecasing, and for the other, a container or a glovecasing.

The insulator 10 is delimited by a wall 14 of which only one part can be seen in FIG. 1. It is equipped, conventionally, for example with remote manipulation means such as remote manipulators and/or gloves (not shown) integral with the wall 14, thanks to which the centralised command mechanism can be manoeuvred from the inside of this cell 10. The container 12 is also delimited by a wall 16, as illustrated in particular in FIG. 1.

The double door sealed transfer device mainly comprises an insulating flange 18, a container flange 20, an insulating door 22 normally blocking a circular opening delimited by the insulating flange 18, and a container door 24 normally blocking an opening delimited by the container flange 20. The insulating flange 18 and the container flange 20 are fixed respectively on the wall 14 of the insulator 10 and on the wall 16 of the container 12. The door 22 of the insulator is articulated on the insulating flange 18 by a hinge 26.

Means designated generally by the reference 28 (not shown), enabling the command of the opening and the closing of the doors 22 and 24.

For example, the fixing of the container door 24 on the container flange 20 is ensured by a bayonet connection 30 as is described in document FR 2 695 343. For example, enabling the container flange 20 to be secured on the insulating flange 18 and the container door 24 to be secured on the insulating door 22, the double door sealed transfer system also comprises two other bayonet connections designated respectively by the references 32 and 34. The three bayonet connections 30, 32 and 34 are arranged such that after docking the container flange 20 on the insulating flange 18, a rotation of the container 12 about the axis thereof, for example clockwise, has the effect of securing the container flange 20 and the insulating flange 18, of securing the container door 24 and the insulating door 22, and of disconnecting the container door 24 from the container flange 20. The two latter operations are carried out consecutively such that the opening of the container only occurs after the container door 24 has been secured to the insulating door 22 to form a double door.

The insulating flange and the insulating door are commonly designated "alpha part". The container flange and the container door are commonly designated "beta part".

Generally, the double door transfer system has a symmetry of revolution about the axis X which is the axis of the insulating flange.

Figure 2A:
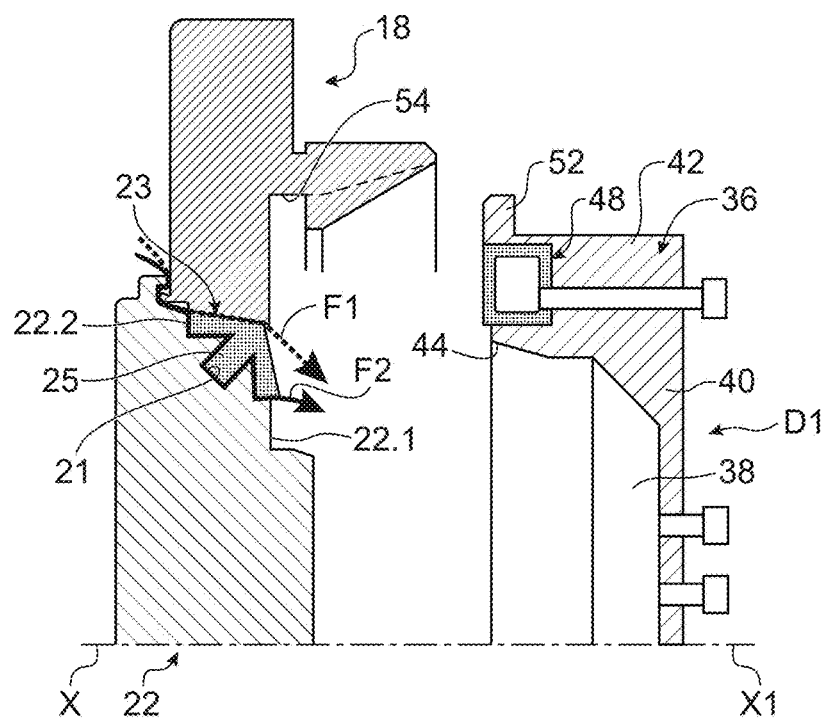
FIG. 2A is a cross-sectional, longitudinal view schematically representing an example of a sealing test device before it is mounted on an insulator, the seal being in the uninflated state.
Figure 2B:
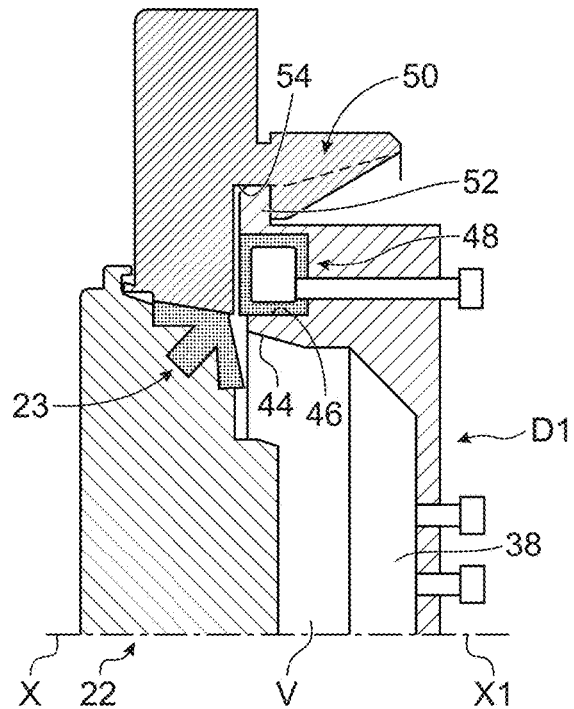
FIG. 2B is a cross-sectional, longitudinal view schematically representing the sealing test device of FIG. 2A mounted on the insulator, the seal being in the uninflated state.
Figure 2C:
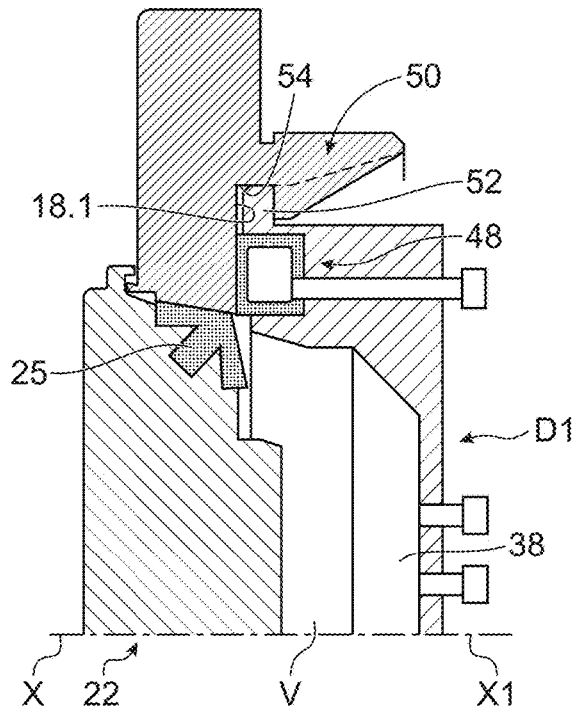
FIG. 2C is a cross-sectional, longitudinal view schematically representing the sealing test device of FIG. 2A mounted on the insulator, the seal being in the inflated state.

In FIGS. 2A to 2C, a schematic representation can be seen of an example of a test device D1 adapted to verify the sealing of an alpha part.

In FIGS. 2A to 2C, the door 22 of the alpha part can be seen in detail. It includes a seal 23 mounted on the outer face 22.1 thereof and on the outer periphery thereof. The seal 23 extends both over the outer face 22.1 of the door and over the side edge 22.2 thereof. The seal 23 ensures, on the one hand, the sealing between the insulating door 22 and the insulating flange 18, and the sealing between the outer face of the insulating door 22 and the outer face of the container door 24, insulating these outer faces from the inside of the closed volumes.

The seal 23 is fixed on the insulating door 22 by means of an annular protrusion 25 designated "heel" mounted in an annular recess 21 formed in the insulating door 22.

Potential leaks can occur between the seal 23 and the insulating flange 18 symbolised by the arrow F1; and between the door 22 and the seal 23 at the level of the mounting of the heel 25, symbolised by the arrow F2.

The test device D1 is produced to enable the detection of the leaks F1 and F2. The test device D1 includes a casing or head 36 delimiting a cavity 38 and including a bottom 40, a side wall 42 and an opening 44 opposite the bottom. The cavity 38 extends along a longitudinal axis X1.

The casing 36 includes a recess 46 surrounding the opening 44 and an inflatable seal 48 mounted in the recess 46. In the uninflated state (FIGS. 2A and 2B); the inflatable seal 48 advantageously does not project from the recess, reducing friction during the connection of the test device D1 on the alpha part. Furthermore, the seal is protected. For example, the inflatable seal 48 is glued by the face thereof opposite the face thereof intended to be expanded.

The inflatable seal is, for example, made of elastomer, for example silicone, butadiene styrene or SBR (styrene-butadiene rubber), EPDM (ethylene-propylene-diene monomer), fluoropolymer, for example FKM, hydrogenated nitrile HNBR (hydrogenated nitrile butadiene rubber).

The diameter of the cavity is selected such that the inflatable seal 48, in the inflated state, does not cover the potential leak zones F1 and F2 of the insulator. In addition, preferably, the casing is such that it does not contact with the seal 23. The dimensions of the casing are such that the edge of the recess 46 adjacent to the opening 44, in other words, the partition between the recess 46 and the opening 44 does not contact with the seal 23. The positioning of the test device D1 is ensured by the fixing means; in the connected state, the casing and in particular, the inner edge of the recess 46 is sufficiently short to not touch the seal 23.

The test device D1 includes means for mechanically connecting 50 the casing 36 on the alpha part, in particular the casing on the insulating flange 18 such that the seal 48, in the inflated state, is in contact with the outer face 18.1 of the insulating flange 18.

Advantageously, the mechanical connecting means 50 engage with the means for securing the container flange 20 on the insulating flange 18. In the example described, these are bayonet means. Thus, the mechanical connecting means 50 are identical to those carried by the container flange 20 since the device D1 is mounted on the flange instead of the container.

In the example shown in FIGS. 2A to 2C, the mechanical connecting means thus include lugs 52 penetrating into a recess 54 of the insulating flange 18 and locking in translation the two flanges 18, 20. In a variant, the mechanical connecting means can be of the snap-fitting type, by screwing, etc.

The test device further includes a pump P1 and a pneumatic circuit C1 selectively connecting the pump P1 to the inflatable seal 48 and to the cavity 38. The circuit C1 is not shown in FIGS. 2A to 2C.

Figure 3:
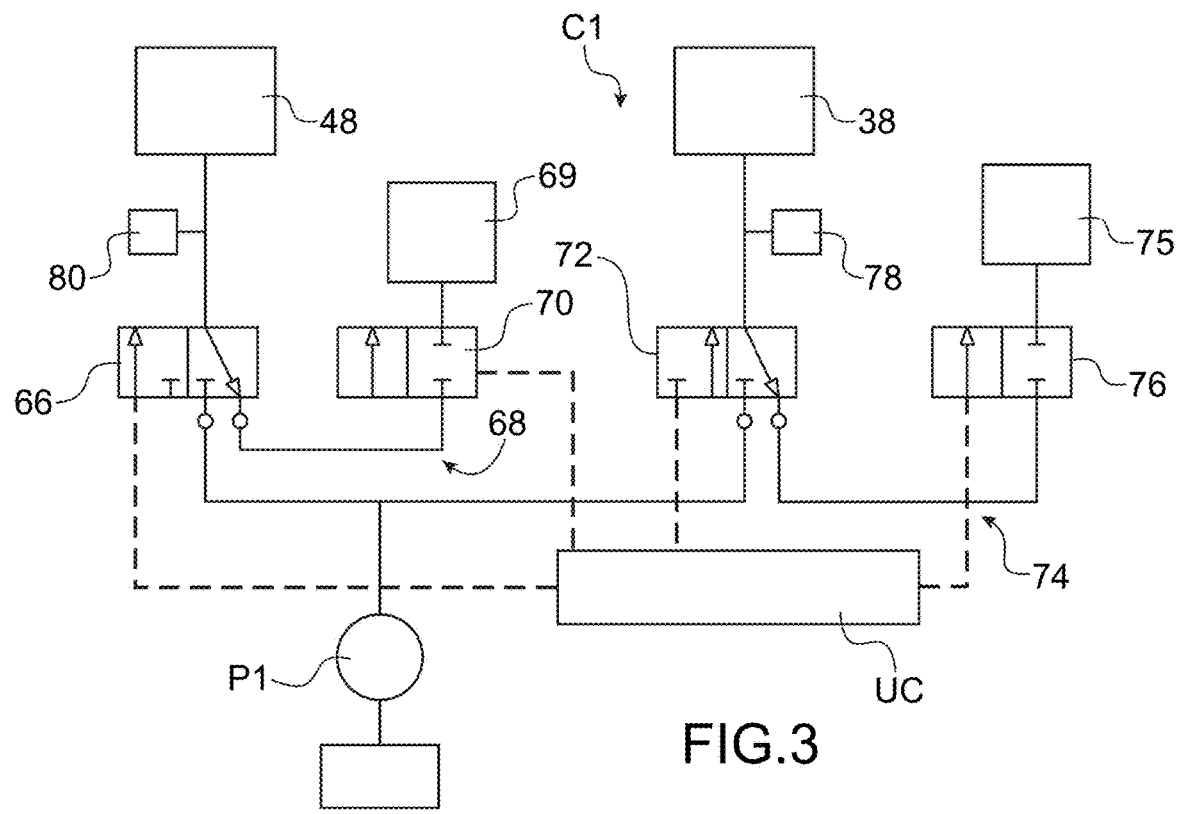
FIG. 3 is a schematic representation of an example of a pneumatic circuit of the sealing test device implemented to test the sealing of a double door transfer system mounted on an insulator.

In FIG. 3, a schematic representation can be seen of an example of such a pneumatic circuit C1.

The pneumatic circuit C1 includes selective connecting means between the pump P1, the inflatable seal 48 and the cavity 38.

Advantageously, the pneumatic connecting means include a first distributor 3/2 66 forming a distribution valve. The distributor including two positions and three orifices, a first orifice connected to the pump P1, a second orifice connected to the inflatable seal 48 and a third orifice connected to a first purge system 68 enabling the seal 48 to be deflated.

The first distributor 3/2 66 includes a slide which could take two positions such that, either it connects the pump P1 and the seal 48 and interrupts the communication between the seal 48 and the first purge system 68, or it connects the seal 48 and the first purge system 68 and interrupts the communication between the pump P1 and the seal 48.

For example, the first purge system 68 includes a first distributor 2/2 70 including a first orifices connected to the third orifice of the first distributor 3/2 66 and a second orifice connected to a purge zone 69. The first distributor 2/2 70 includes two positions, a position wherein the first orifice is connected to the second orifice, and a position wherein the connection between the first and the second orifice is interrupted.

Advantageously, the pneumatic connecting means include a second distributor 3/2 72 forming a distribution valve, including a first orifice connected to the pump P1, a second orifice connected to the cavity 38 and a third orifice connected to a second purge system 74 enabling the cavity to be drained.

The slide of the second distributor 3/2 72 can take two positions such that, either it connects the pump P1 and the cavity 38 and interrupts the communication between the cavity 38 and the second purge system 74, or it connects the cavity 38 and the second purge system 74 and interrupts the communication between the pump P1 and the cavity 38.

For example, the second purge system 74 includes a second distributor 2/2 76 including a first orifice connected to the third orifice of the second distributor 3/2 72, and a second orifice connected to a purge zone 75. The second distributor 2/2 76 includes two positions, a position wherein the first orifice is connected to the second orifice, and a position wherein the connection between the first and the second orifice is interrupted.

The means for moving the slides of the distributors 66, 70, 72, 76 are advantageously electromechanical means, the distributors being electrically operated valves or solenoid valves. In a variant, the means for moving the slides are pneumatic means or mechanical means.

The distributors 66, 70, 72, 76 are advantageously commanded by a control unit UC, for example carried by an electronic board.

It will be understood that all or some of the distributors 66, 70, 72, 76 can be replaced by individual valves commanded by the control unit UC.

The pump P1 is such that it enables the seal 48 to be inflated at a pressure of several bar, for example at a pressure of 2 bar at a low flow rate, indeed the volume of the seal is small. Furthermore, the pump P1 enables a vacuum with respect to the outer pressure for example—40 mbar to be generated in the cavity 38 which has a reduced volume.

A diaphragm pump very advantageously enables both the inflation of the seal and the generation of vacuum in the cavity to be ensured. In a variant, a piston pump, a vane pump, or impeller pump can be used in the test device.

The pneumatic circuit C1 also includes means 78 for controlling the pressure in the cavity 38 in order to verify the sealing thereof, the means 78 for example include a pressure sensor. Indeed, if the pressure increases, this means that the alpha part is not sealed.

Very advantageously, it also includes monitoring means 80 for monitoring the pressure in the inflatable seal 48 enabling the verification of the state thereof and/or the mounting of the device on the insulating flange 18. For example, the monitoring means 80 include a pressure switch. The pressure switch controls a loss of pressure. The predefined instruction corresponds to the inflation pressure value of the seal which has been fixed beforehand. The pressure switch compares the predefined instruction and the actual pressure measurement of the seal. When this instruction/measurement difference exceeds a threshold, for example if the seal is pierced, the pressure switch sends a signal, for example an alarm in the form of a warning light.

Thus, it is possible to verify if the pressure remains stable for the whole duration of the test, and that the conditions of the test are valid. During the inflation, the pressure switch commands the stopping of the pump when the inflation pressure of the seal is reached.

The circuit C1 has an optimised bulk with a reduced number of distributors.

The operation of the device D1 for testing the sealing of an alpha part will now be described.

The device D1 is connected to the flange of the alpha part as a container would be. In this example, the connection of the device to the alpha part is of the bayonet type.

The distributors 2/2 70, 76 are in a position interrupting the connections to the purge zones 69, 75.

When the device D1 is mounted on the alpha part, the cavity 38 of the test device is closed by the alpha part, the control unit UC commands the first distributor 3/2 66 so as to connect the pump P1 to the inflatable seal 48 and commands the pump P1 to inflate the seal 48. When the seal 48 is sufficiently inflated, the pump P1 is stopped. The first distributor 3/2 66 is then commanded to insulate the seal 48 and the pump P1, and to connect the seal 48 to the first distributor 2/2 70 which is in the blocked position. The volume of the seal is thus closed. The cavity 38 delimited by the alpha part with the inflatable seal forms a test volume V.

The test phase starts. The control unit UC commands the second distributor 3/2 72 so as to connect the pump P1 to the cavity 38 and activates the pump P1 so as to suction the fluid, for example air, in the cavity 38 in order to generate a negative pressure with respect to the outer pressure. When the desired pressure level is reached, the operation of the pump P1 is interrupted and the second distributor 3/2 72 is switched so as to insulate the cavity 38 by connecting it to the second distributor 2/2 76 which is in the blocked position.

The pressure level in the cavity 38 is then monitored by the means 78.

If the pressure increases, this means that there is a leak between the inside of the insulator and the cavity. It is deduced from this, that the alpha part, i.e. the connection between the door and the flange of the alpha part is not sealed. The inflatable seal contacts with the alpha part so as to not block potential leak zones.

If the pressure in the cavity is stable, it is concluded from this that the alpha part is sealed.

The first 70 and second 76 distributors 2/2 are then commanded to connect the seal 48 and the cavity 38 to the respective purge zones 69, 75 thereof.

Figure 4:
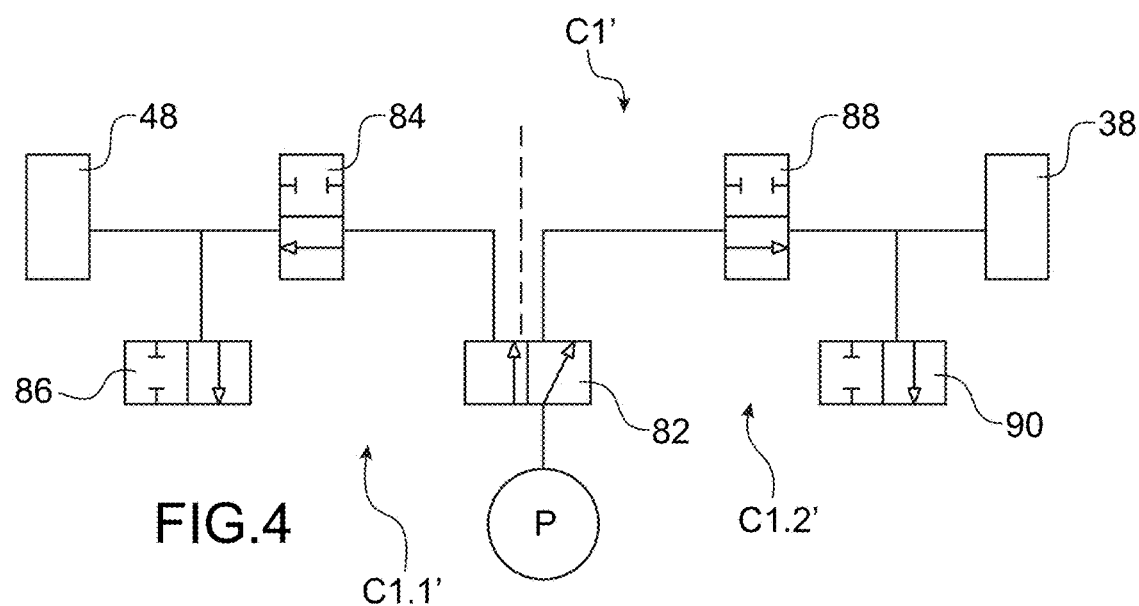
FIG. 4 is a schematic representation of a variant of the pneumatic circuit of FIG. 3.

In FIG. 4, a variant C1' of the circuit C1 can be seen.

The circuit C1' includes a first distributor 3/2 82 selectively connecting the pump to the inflatable seal 48 and to the cavity 38.

The circuit C1' includes a branch C1.1' between the distributor 82 and the inflatable seal 48 and a branch C1.2' between the distributor 82 and the cavity 38.

The branch C1.1' includes a distributor 2/2 84 enabling or not the flow between the distributor 82 and the inflatable seal and a distributor 2/2 86 downstream from the distributor 84 to drain the inflatable seal 48.

The branch C1.2' includes a distributor 2/2 88 enabling or not the flow between the distributor 82 and the cavity 38, and a distributor 2/2 90 downstream from the distributor 88 to drain the cavity 38.

The different distributors are commanded by the control unit.

The operation of the circuit C1' is similar to that of the circuit C1.

Figure 5A:
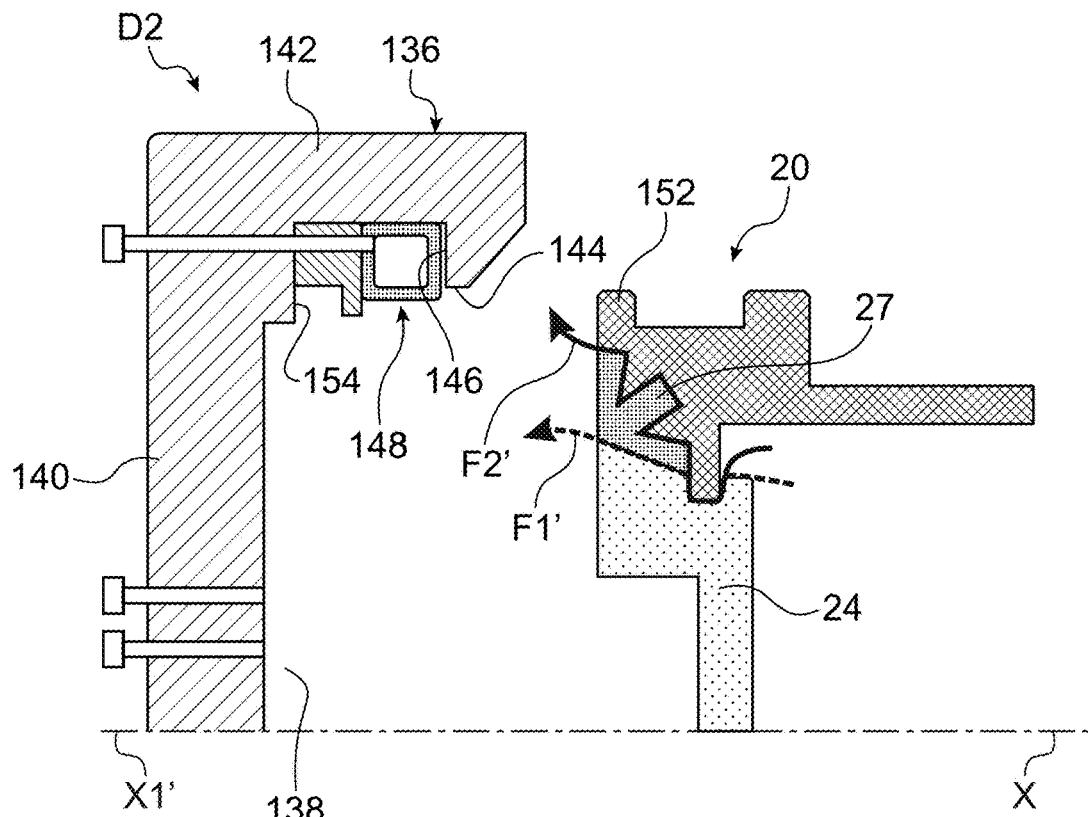
FIG. 5A is a cross-sectional, longitudinal view schematically representing an example of a sealing test device before it is mounted on a container, the seal being in the uninflated state.
Figure 5B:
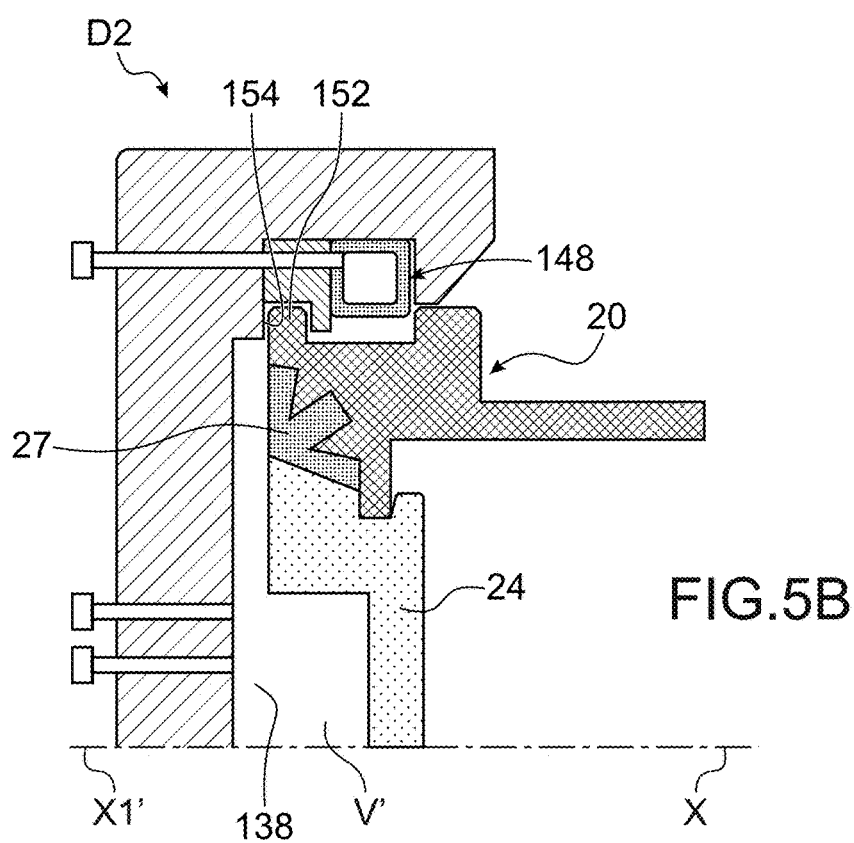
FIG. 5B is a cross-sectional, longitudinal view schematically representing the sealing test device of FIG. 5A mounted on a container, the seal being in the uninflated state.
Figure 5C:
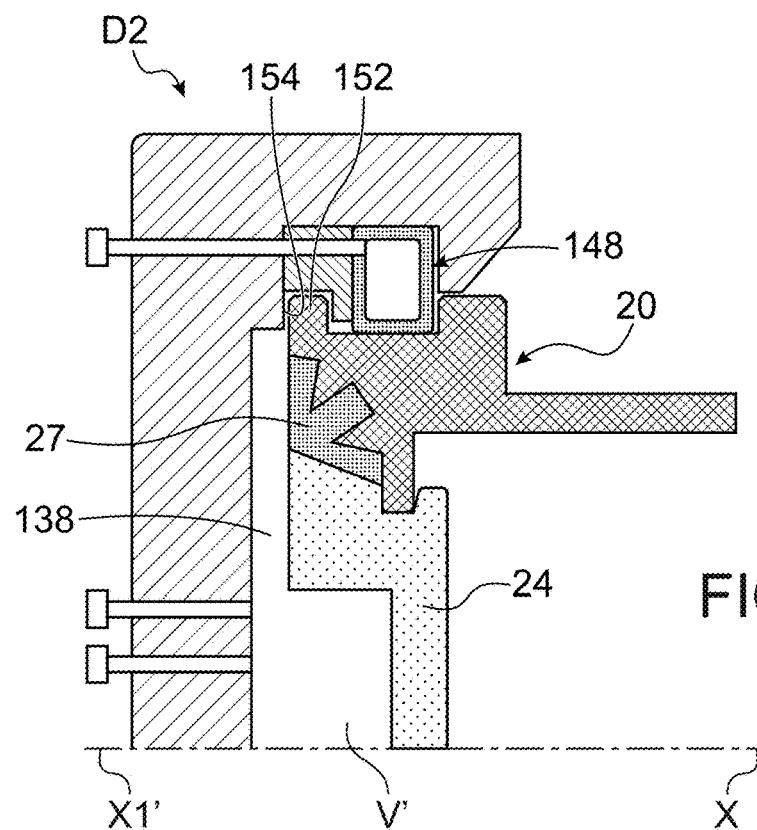
FIG. 5C is a cross-sectional, longitudinal view, schematically representing the sealing test device of FIG. 5A mounted on a container, the seal being in the inflated state.

In FIGS. 5A to 5C, an example of a device D2 can be seen, enabling the beta part to be tested.

In FIGS. 5A to 5C, a sealing test device D2 can be seen, particularly adapted to testing the sealing of a beta part. The container flange 20 includes a seal 27 similar to the seal 23 mounted on the insulating door 22.

The device D2 is very close to the device D1, in that it also implements an inflatable seal to delimit a sealed cavity with the beta part. It differs from the device D1 by the fact that the inflatable seal 148 contacts with the radially outer periphery of the container flange 20. The device D2 has an axis of revolution X1'.

The casing 136 includes a cavity 138 delimited by a bottom 140 and a side wall 142, an opening 144 of diameter lower than the inner diameter of the cavity, so as to delimit the radial recess 146 in the casing housing the inflatable seal 148.

For example, the inflatable seal 148 is glued by the opposite face thereof to the face intended to be expanded. The inflatable seal 148 is glued to the bottom of the radial recess 146. The examples of materials given for the seal 48 are applied to the seal 148.

Advantageously, the opening 144 has a radially inner bevelled edge facilitating the mounting of the casing on the beta part.

The mounting of the device on the beta part is such that a clearance is left between the free face of the beta part and the bottom 140 of the cavity 138 so as to arrange a test volume V' between the beta part and the device and avoid blocking the potential leak zones F1' and F2'. The volume V' is typically a few cm³.

In the example shown in FIGS. 5A to 5C, the test device D2 is configured to be connected to a beta part by a bayonet type connection. In this example, the device D2 includes lugs 152 arranged in the radial recess 146 between the bottom of the cavity 138 and the seal 148, and engaging with the outer peripheral edge of the container flange 20.

In a variant, the mechanical connection means can be of the snap-fitting type, by screwing, etc.

The operation of the test device D2 to verify the sealing of the beta part is similar to that of the device for testing the sealing of the alpha part. Therefore, it will not be described in detail.

Figure 6:
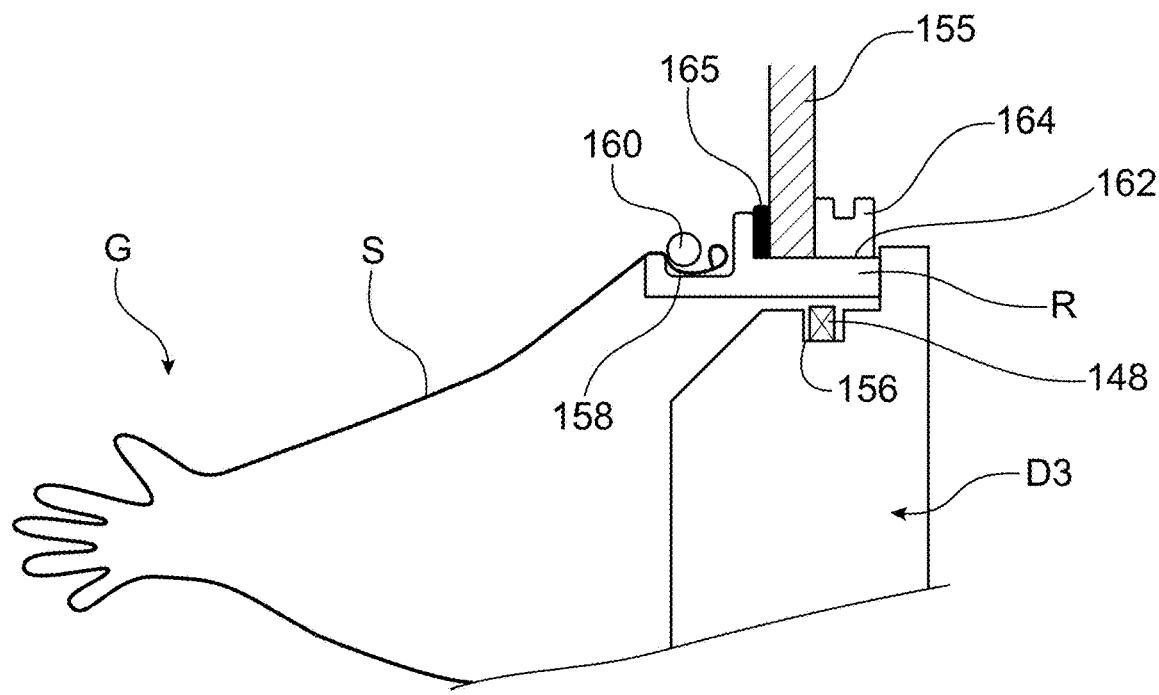
FIG. 6 is a cross-sectional, longitudinal view, schematically representing an example of a sealing test to test the sealing of a glove.

In FIG. 6, a schematic representation can be seen of an example of a device D3 enabling the testing of the sealing of a glove G intended to be mounted in a glovecasing port. This device is capable of verifying the sealing of the whole system comprising at least one flexible part or element that is desired to be connected to the insulator. For example, it can be a glove, a cuff associated with a glove, a diving suit, a half diving suit.

With the volume of a diving suit or half diving suit being substantially different from that of a glove, a pump adapted to inflate a diving suit or half diving suit and different from that implemented to inflate a glove, will preferably be used to reduce the duration of the test.

The glove includes a flexible part S provided with an opening and intended to be connected in a sealed manner to a gloveport R fixed through a wall 155 of the insulator.

The device D3 has a configuration close to that of the device D2. The seal 148 is mounted in a side recess 156 so as to contact with the inner side surface of the gloveport R. For example, as is shown in FIG. 6, the opening of the glove is mounted on a gloveport end which is provided with a recess 158 on the outer periphery thereof. An O-ring 160 is mounted above the glove in the recess 158 and ensures the maintaining of the glove G on the gloveport R.

In the example shown, the gloveport R is provided with a screw thread 162 at the level of an end opposite that carrying the recess 158, the screw thread being intended to be arranged outside of the insulator. A nut 164 is screwed on the screw thread from the outside of the insulator and immobilises the gloveport R through the wall. Preferably, a seal 165 is inserted between the gloveport R and the wall 155 inside the insulator.

The device D3 includes one single pump P2 and a pneumatic circuit selectively connecting the pump to the inflatable seal or to the glove.

Figure 7:
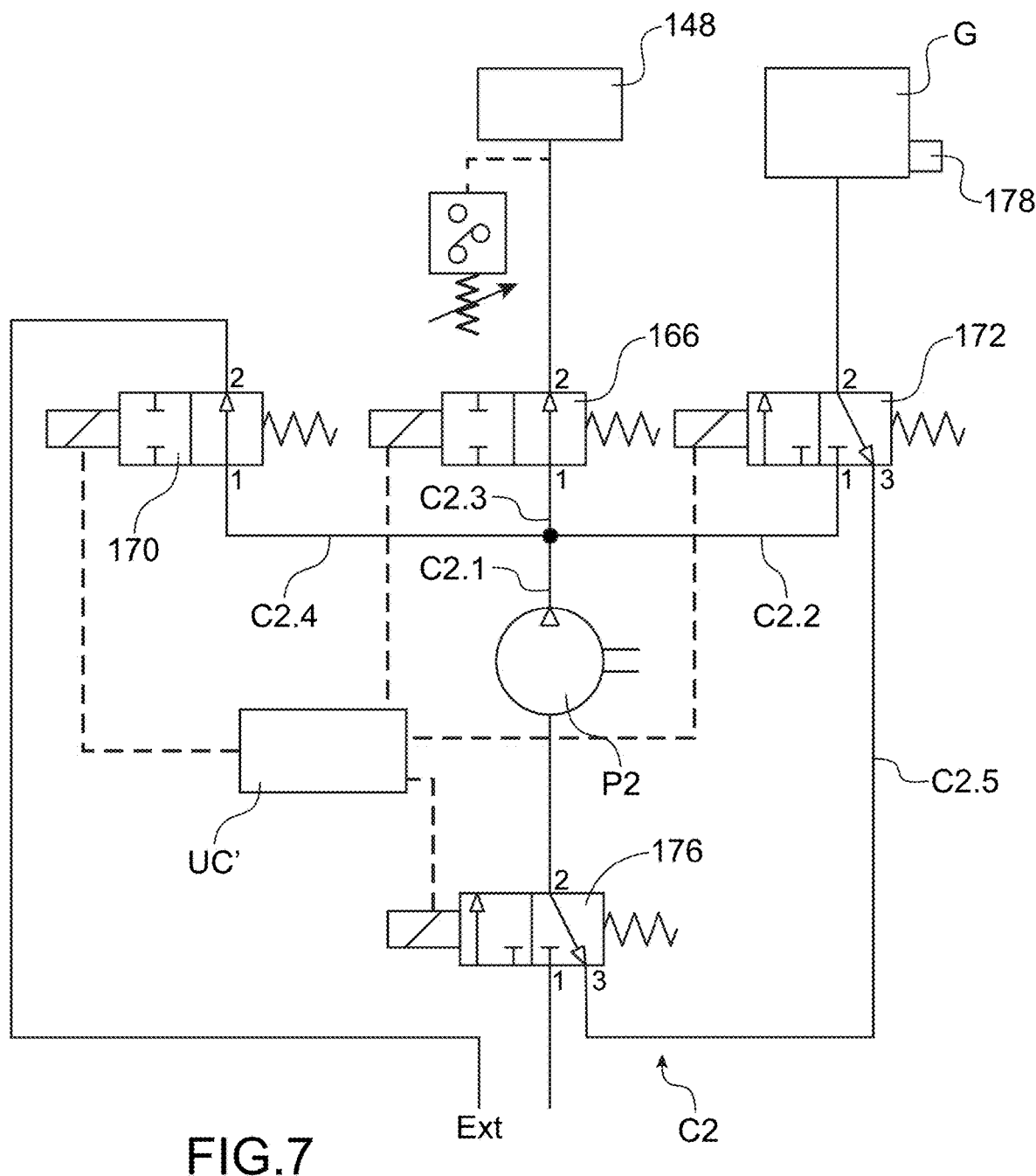
FIG. 7 is a schematic representation of an example of a pneumatic circuit of the sealing test device implemented to test the sealing of a glove and also adapted to test the sealing of a double door transfer system.

In FIG. 7, a schematic representation can be seen of an example of such a pneumatic circuit C2.

The pneumatic circuit C2 includes selective connection means between the pump P2, the inflatable seal 148 and inside the glove G.

The pump P2 includes a depression orifice by which air is suctioned and a pressure orifice by which air is expelled.

The pneumatic circuit C2 includes a branch C2.1 connected directly to the pressure orifice of the pump P2 and three branches C2.2, C2.3 and C2.4 all connected to the branch C2.1.

The branch C2.2 connects the pressure orifice of the pump P2 and to the inside of the glove via the branch C2.1. The branch C2.2 includes a distributor 3/2 172 forming a distribution valve including a first orifice connected to the branch C2.1, a second orifice connected to the glove G and a third orifice connected to the depression orifice of the pump, the valve 172 being able to be switched to connect the second orifice to the first orifice or to the third orifice.

The branch C2.3 connects the pump P2 and the inside of the inflatable seal 148 via the branch C2.1. It includes a distributor 2/2 166 forming a distribution valve including a first orifice connected to the branch C2.1 and a second orifice connected to the inflatable seal.

The branch C2.4 includes a distributor 2/2 170 including an orifice connected to the branch C2.1 and an orifice connected to the outer environment.

The circuit also includes a branch C2.5 including a distributor 3/2 176 including an orifice connected to the depression orifice of the pump P2, an orifice connected to the glove via the valve 172 and an orifice connected to the outside. The valve 176 can switch to put the first orifice in communication with the second orifice or with the third orifice.

As for the device D1, the means for moving the slides of the distributors 166, 170, 172, 176 are advantageously electromechanical means, the distributors being electrically operated valves or solenoid valves. In a variant, the means for moving the slides are pneumatic means or mechanical means.

The distributors 166, 170, 172, 176 are advantageously commanded by a control unit UC', for example carried by an electronic board.

It will also be understood that all or some of the distributors 166, 170, 172, 176 can be replaced by individual valves commanded by the control unit UC'.

The device D3 also includes means 178 for verifying the pressure in the glove, in order to verify the sealing thereof. Indeed, if the pressure decreases, this means that the glove is not sealed. For example, the means include a pressure sensor.

The operation of the device D3 will now be described. The glove is mounted in a sealed manner on a device for connecting a glovecasing by way of the gloveport, in a known manner.

The glove is deployed inside the insulator.

The device D3 is mounted in the gloveport R (FIG. 6).

First, the inflatable seal 148 is inflated. For this, the valves 166 and 172 are in the position of FIG. 7, the valve 170 is switched to interrupt the circulation in the branch C2.4 and the valve 172 is switched to connect the depression orifice to the outer environment. The pump is actuated. The seal 148 is inflated. The pump P2 is stopped when the seal is sufficiently inflated. The valve 166 is switched to insulate the seal.

The test phase starts. The control unit commands the distributor 3/2 172 to connect the pump P2 to the inside of the glove G and activates the pump P2 so as to inflate the glove G, for example at a pressure of the order of 10 mbar. When the desired pressure level is reached, the operation of the pump P2 is interrupted and the distributor 3/2 172 is switched to as to insulate the inside of the glove G.

The pressure level in the glove G is then monitored.

If the pressure decreases, this means that the glove G includes a leak and the glove G is considered as faulty. The glove must be replaced.

If the pressure in the glove is stable, it is concluded from this that the glove is sealed and can be used.

When the test is ended, the seal and the glove are deflated. Very advantageously, a step of deflating or purging the glove by force occurs. The valves 166 and 172 are switched to connect the inside of the glove to the depression orifice of the pump P2 and the valve 170 is switched to connect the pressure orifice of the pump to the outer environment via the branch C2.4. The pump P2 is actuated suctioning air from the glove G, which ensures a rapid deflating of the glove which has a significant volume.

The seal is connected directly to the outer environment by switching the valve 166. Indeed, the seal has a volume substantially lower than that of the glove, the natural deflating thereof is therefore very rapid.

The device D3 therefore has the advantage of ensuring a rapid deflating of the glove. Furthermore, it has a great compactness.

Furthermore, the pneumatic circuit C2 has the advantage of being able to be used for a device D1 for testing the sealing of an alpha part or for a device D2 for testing the sealing of a beta part, in order to test a double door transfer system. Indeed, the connection between the valve 166 and the depression orifice of the pump enables the generation of a depression in the system to be tested, which is desired to test a double door transfer system.

Thus, the pneumatic circuit C2 enables the testing of both gloves and any flexible connection object such as listed above and the double door transfer systems according to it being mounted on a device D1, D2 or D3.

Figure 8:
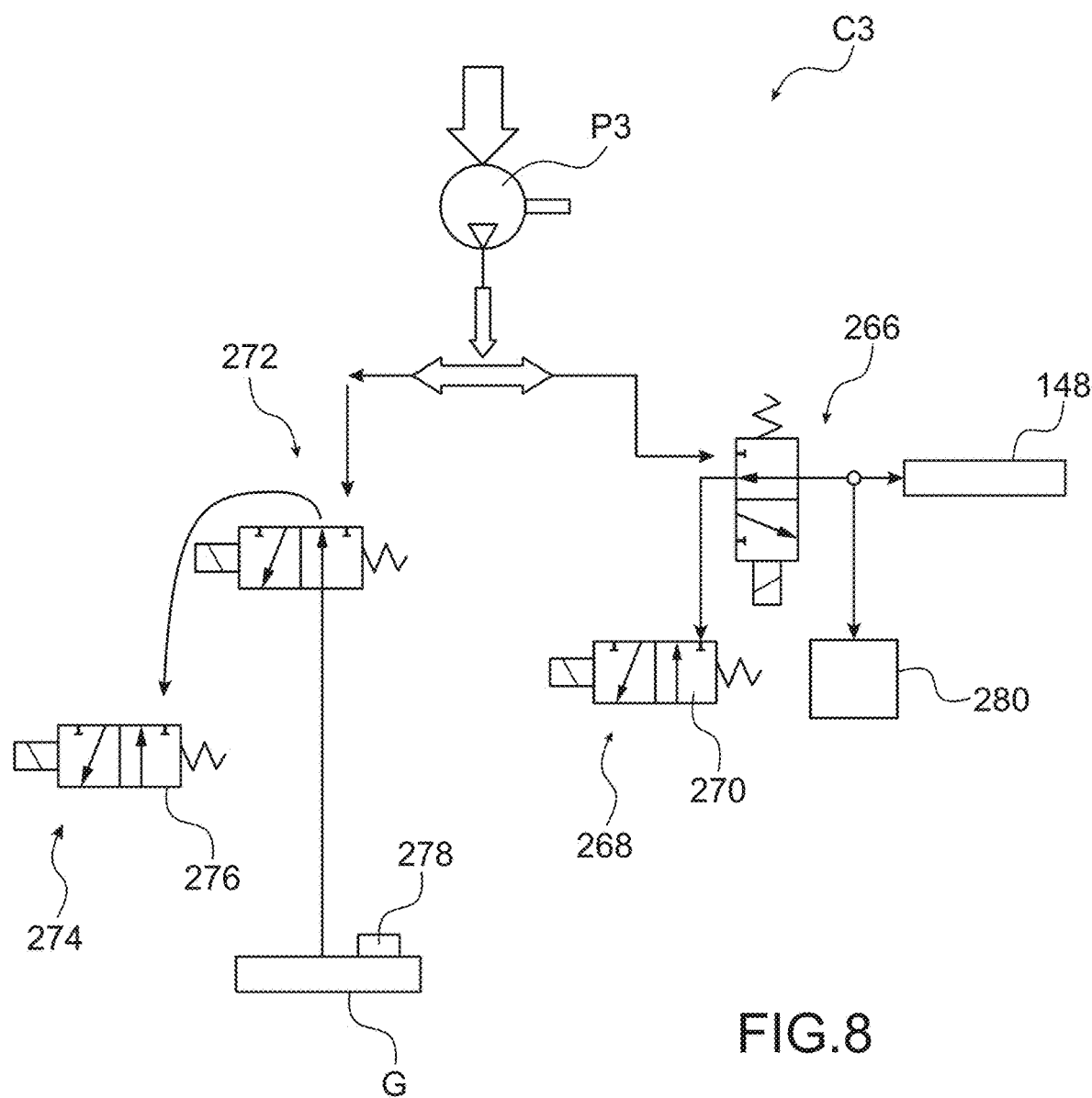
FIG. 8 is a schematic representation of another example of a pneumatic circuit of the sealing test device implemented to test the sealing of a glove.

In FIG. 8, another example of a circuit C3 can be seen, adapted to the device enabling the testing of the sealing of a glove G intended to be mounted in a glovecasing port.

Advantageously, the pneumatic connection means include a first distributor 3/2 266 forming a distribution valve, including a first orifice connected to the pump P3, a second orifice connected to the inflatable seal 148 and a third orifice connected to a first purge system 268 enabling the seal 148 to be deflated.

The first distributor 3/2 266 includes a slide such that it can connect the pump P3 and the seal 148 or the seal 148 and the first purge system 268.

For example, the first purge system 268 includes a distributor 2/2 270 between a purge zone and the third orifice of the first distributor 3/2 266.

Advantageously, the pneumatic connection means include a second distributor 3/2 272 forming a distribution valve, including a first orifice connected to the pump P3, a second orifice connected to the inside of the glove G and a third orifice connected to a second purge system 274 enabling the inside of the glove G to be purged.

The second distributor 3/2 272 includes a slide such that it can connect the pump P3 and the inside of the glove G or the inside of the glove G and the second purge system 274.

For example, the second purge system 274 includes a distributor 2/2 276 between a purge zone and the third orifice of the second distributor 3/2 272.

The operation of the device for testing the sealing of a glove equipped with the circuit C3 will now be described.

The test device is mounted in the gloveport R.

The distributors 270, 276 of the purge systems are in a closing position.

The control unit commands the first distributor 3/2 266 so as to connect the pump P3 to the seal 148 and commands the pump P3 to inflate the seal 148. When the seal 148 is sufficiently inflated, the pump P3 is stopped. The first distributor 3/2 266 is commanded to insulate the seal 148 of the pump P3. The seal 148 is connected to the distributor 270 which is in the blocked position. The inside of the glove delimited by the test device and the inflatable seal forms a test volume.

The test phase starts. The control unit commands the second distributor 3/2 272 connecting the pump P3 to the inside of the glove G and activates the pump P3 so as to inflate the glove G, for example at a pressure of the order 10 mbar. When the desired pressure level is reached, the operation of the pump P3 is interrupted and the second distributor 3/2 272 is switched so as to insulate the inside of the glove G by connecting it to the distributor 276 of the second purge system 274 which is in the blocked position.

The pressure level in the glove G is then monitored.

If the pressure decreases, this means that the glove G includes a leak and the glove G is considered as faulty. If the pressure in the glove is stable, it is concluded from this that the glove is sealed and can be used.

The distributors 270, 276 of the purge systems 268, 274 are then commanded to connect the seal 148 and the glove G to the purge systems 268, 274 respectively.

The running of the sealing test and the commanding of the distributors and of the pump of the different devices described above are preferably automated, the command unit emitting orders to the distributors and to the pump according to a determined sequence and sending a message to the user to inform of the result of the test, for example by means of a colour light. The test is simplified, and the risks of incorrect manipulations are substantially reduced.

In a variant, it can be considered that the user manually commands all or some of the distributors and the pump according to the determined sequence.

It will be understood that the configuration of the pneumatic circuits can vary substantially according in particular to the available place and to the number of distributors which could be used.

The test device according to the invention has the advantage of being compact and of reduced mass due to the implementation of one single pump to ensure the sealing of the mounting of the device on the system to be tested and to carry out the sealing test.

Furthermore, the device is of relatively simple use. In addition, the risks of malfunctioning due to the limited number of components are reduced.

The invention claimed is:

1. Device for testing the sealing of at least one system for insulating two mediums in a sealed manner, said test device including a casing comprising an inflatable seal configured to contact, in the inflated state, with the system and to ensure a sealing enabling the definition of a test volume between the system and the casing, a pneumatic pump and a pneumatic circuit configured, in a first step, to connect the pump to the inflatable seal such that the pump inflates the inflatable seal, and in a second step, to connect the pump to the test volume such that the pump generates in the test volume a pressure at a given value, and at least one sensor for measuring the pressure in the test volume, the pneumatic circuit being configured to ensure at least a connection of the test volume with a depression orifice of the pump, wherein the pneumatic circuit includes at least one distributor between the pump and the inflatable seal, at least one distributor between the pump and the test volume, and at least one distributor between the inflatable seal, the test volume and a draining zone, and wherein the distributor between the pump and the test volume is configured to ensure at least a connection of the test volume with the depression orifice of the pump.

2. Sealing test device according to claim 1, wherein the distributor between the pump and the test volume is configured to ensure a connection of the test volume with a pressure orifice of the pump.

3. Sealing test device according to claim 2, including a control unit configured to command the pump and the pneumatic circuit, and wherein the command unit is configured to command the distributors so as to connect, in a phase, the inflatable seal to the pressure orifice of the pump and, in another following phase, the test volume to the depression orifice of the pump.

4. Sealing test device according to claim 1, including a control unit configured to command the pump and the pneumatic circuit.

5. Sealing test device according to claim 1, wherein the pneumatic circuit includes a monitoring system for monitoring the pressure in the inflatable seal.

6. Sealing test device according to claim 1, wherein the pump is a diaphragm pump.

7. Sealing test device according to claim 1, the system to be verified being a double door transfer system of an insulator, wherein the pump is configured to reduce the pressure in the test volume with respect to an outer pressure.

8. Sealing test device according to claim 7, including fixing means configured to engage with the system to be tested.

9. Sealing test device according to claim 1, the system to be verified being a double door transfer system of a container, wherein the pump is configured to reduce the pressure in the test volume with respect to an outer pressure.

10. Sealing test device according to claim 9, including fixing means configured to engage with the system to be tested.

11. Sealing test device according to claim 1, the system to be verified comprising at least one flexible part, wherein the pump is configured to inflate the flexible part.

12. Sealing test device according to claim 1, the system to be verified being either a system comprising a flexible part, or a double door transfer system of an insulator or of a container, the sealing test including a control unit configured to command the pump and the pneumatic circuit, and comprising a distributor between the pump and the test volume configured to ensure a connection of the test volume with a pressure orifice of the pump, and wherein, in the case of the test of a system comprising a flexible part, the control unit is configured to connect, in a test phase, the system comprising a flexible part to the pressure orifice of the pump and to connect, at the end of the test, the system comprising a flexible part to the depression orifice of the pump and, in the case of the test of a double door transfer system, the control unit is configured to connect, in a test phase, the test volume to the depression orifice of the pump.

13. Sealing test device according to claim 1, including a control unit configured to command the pump and the pneumatic circuit and wherein the control unit includes at least one emitter for emitting a signal representative of the result of the sealing test.

14. Sealing test device according to claim 1, wherein the distributors are solenoid valves.

15. Method for testing the sealing of a system for insulating two mediums in a sealed manner implementing a sealing test device according to claim 1, and comprising:
mounting of the device on the system;
pneumatic connection of the pump to the inflatable seal;
activation of the pump until the pressure in the inflatable seal reaches a first given value;
stopping of the pump;
pneumatic connection of the pump to the test volume;
activation of the pump to establish a pressure at a second given value in the test volume;
stopping of the pump;
monitoring of the pressure in the test volume;
emission of a signal representative of the result of the test; and
draining of the inflatable seal and of the test volume, if necessary.

16. Sealing test method according to claim 15, wherein the first given value is of the order of 2 bar.

17. Sealing test method according to claim 15, the system being a double door transfer system of an insulator or of a container, the first given value being a pressure lower than an outer pressure.

18. Sealing test method according to claim 15, the system being a system comprising a flexible part, the second value being a positive pressure of the order of a few mbar to a few tens of mbar.

19. Sealing test method according to claim 18, wherein for the draining step, the system comprising a flexible part is connected to the depression orifice of the pump.

* * * * *